United States Patent
Andrews

(10) Patent No.: US 9,297,896 B1
(45) Date of Patent: Mar. 29, 2016

(54) ELECTRONICALLY STEERED WEATHER RADAR

(75) Inventor: Joel M. Andrews, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 820 days.

(21) Appl. No.: 13/478,944

(22) Filed: May 23, 2012

Related U.S. Application Data

(60) Provisional application No. 61/489,485, filed on May 24, 2011.

(51) Int. Cl.
| | |
|---|---|
| *G01S 13/95* | (2006.01) |
| *H01Q 3/26* | (2006.01) |
| *H01Q 3/30* | (2006.01) |
| *H01Q 3/34* | (2006.01) |
| *H01Q 3/36* | (2006.01) |

(52) U.S. Cl.
CPC ............... *G01S 13/953* (2013.01); *G01S 13/95* (2013.01); *G01S 13/951* (2013.01); *G01S 13/955* (2013.01); *G01S 13/956* (2013.01); *G01S 13/958* (2013.01); *H01Q 3/26* (2013.01); *H01Q 3/30* (2013.01); *H01Q 3/34* (2013.01); *H01Q 3/36* (2013.01)

(58) Field of Classification Search
CPC .................... G01S 7/003; G01S 7/006; G01S 13/95–13/958; H01Q 3/34; H01Q 3/26; H01Q 3/30; H01Q 3/00; H01Q 3/24; H01Q 3/36; H01Q 3/2605
USPC .......... 342/21, 26 R, 26 A, 26 B, 26 C, 26 D, 342/147–158, 195, 196, 350, 359, 360, 368, 342/371, 372, 377, 380, 383
See application file for complete search history.

(56) References Cited

U.S. PATENT DOCUMENTS

| | | | | | |
|---|---|---|---|---|---|
| 3,964,066 | A | * | 6/1976 | Nemit | 342/373 |
| 4,246,539 | A | * | 1/1981 | Haruki et al. | 455/76 |
| 4,257,050 | A | * | 3/1981 | Ploussios | 342/372 |
| 4,277,787 | A | * | 7/1981 | King | 342/371 |

(Continued)

OTHER PUBLICATIONS

Hildebrand, Peter H. et al., Real-time Computation of Dual-Doppler Winds from Airborne Research Doppler Radar Systems, 27th Conference on Radar Meteorology, cover page and p. 365-367, Oct. 9-13, 1995.

(Continued)

*Primary Examiner* — Peter Bythrow
(74) *Attorney, Agent, or Firm* — Samuel M. Korte; Maxwell M. Ali

(57) ABSTRACT

An electronically steered weather radar system comprises a plurality of transmit/receive modules, a plurality of antenna modules, and a system signal processor. Each transmit/receive module may be configured to adjust a phase characteristic of a radio frequency (RF) signal to be transmitted and received. Antenna modules may be in communication with transmit/receive modules and may form an antenna array configured to transmit a system beam in a direction determined by the phase of the RF signal from each transmit/receive module and to generate the RF signal from the received system beam. The system signal processor may be configured to perform a first scan to detect meteorological formations wherein the system signal processor communicates with each transmit/receive module to adjust a phase characteristic of the RF signals such that the antenna array transmits and receives the system beam through a plurality of azimuth angles and a plurality of elevation angles.

33 Claims, 5 Drawing Sheets

(56) References Cited

U.S. PATENT DOCUMENTS

| | | | |
|---|---|---|---|
| 4,445,119 A * | 4/1984 | Works | 342/377 |
| 4,628,318 A | 12/1986 | Alitz | 342/26 |
| 4,649,388 A * | 3/1987 | Atlas | 342/26 D |
| 4,684,951 A * | 8/1987 | Baumer | 342/362 |
| 4,776,039 A * | 10/1988 | Akaiwa | 455/205 |
| 4,872,016 A * | 10/1989 | Kress | 342/380 |
| RE33,152 E | 1/1990 | Atlas | 342/26 R |
| 4,965,573 A * | 10/1990 | Gallagher et al. | 340/968 |
| 5,008,680 A | 4/1991 | Willey et al. | 342/372 |
| 5,198,819 A * | 3/1993 | Susnjara | 342/26 B |
| 5,202,690 A | 4/1993 | Fredrick | 342/26 |
| 5,225,839 A * | 7/1993 | Okurowski et al. | 342/174 |
| 5,263,197 A * | 11/1993 | Manjo et al. | 455/324 |
| 5,303,417 A | 4/1994 | Laws | 455/314 |
| 5,311,183 A * | 5/1994 | Mathews et al. | 342/26 B |
| 5,339,086 A * | 8/1994 | DeLuca et al. | 342/371 |
| 5,351,053 A * | 9/1994 | Wicks et al. | 342/158 |
| 5,412,414 A * | 5/1995 | Ast et al. | 342/174 |
| 5,485,156 A | 1/1996 | Manseur et al. | 342/77 |
| 5,500,646 A * | 3/1996 | Zrnic | 342/188 |
| 5,504,490 A * | 4/1996 | Brendle et al. | 342/118 |
| 5,523,759 A | 6/1996 | Gillberg et al. | 342/26 |
| 5,585,803 A * | 12/1996 | Miura et al. | 342/372 |
| 5,606,736 A * | 2/1997 | Hasler et al. | 455/314 |
| 5,608,404 A * | 3/1997 | Burns et al. | 342/25 A |
| 5,623,270 A * | 4/1997 | Kempkes et al. | 342/372 |
| 5,745,076 A * | 4/1998 | Turlington et al. | 342/372 |
| 5,752,169 A * | 5/1998 | Hareyama et al. | 455/76 |
| 5,761,615 A * | 6/1998 | Jaffee | 455/314 |
| 5,781,146 A | 7/1998 | Fredrick | 342/26 |
| 5,852,784 A * | 12/1998 | Ito et al. | 455/552.1 |
| 5,907,568 A | 5/1999 | Reitan, Jr. | 342/26 |
| 5,940,029 A * | 8/1999 | Ninomiya et al. | 342/372 |
| 6,061,013 A * | 5/2000 | Sauvageot et al. | 342/26 R |
| 6,087,986 A * | 7/2000 | Shoki et al. | 342/383 |
| 6,104,343 A * | 8/2000 | Brookner et al. | 342/372 |
| 6,175,326 B1 * | 1/2001 | Kare | 342/25 R |
| 6,201,494 B1 * | 3/2001 | Kronfeld | 342/26 R |
| 6,377,213 B1 * | 4/2002 | Odachi et al. | 342/383 |
| 6,424,288 B1 | 7/2002 | Woodell | 342/26 |
| 6,492,932 B1 * | 12/2002 | Jin et al. | 342/25 R |
| 7,019,682 B1 * | 3/2006 | Louberg et al. | 342/22 |
| 7,064,710 B1 * | 6/2006 | Ksienski et al. | 342/372 |
| 7,109,912 B1 * | 9/2006 | Paramore et al. | 342/26 B |
| 7,242,343 B1 * | 7/2007 | Woodell | 342/26 B |
| 7,483,687 B2 * | 1/2009 | Carrez | 455/318 |
| 7,486,220 B1 * | 2/2009 | Kronfeld et al. | 342/26 B |
| 7,554,486 B2 * | 6/2009 | Walker | 342/174 |
| 7,592,948 B2 * | 9/2009 | Walker | 342/174 |
| 7,671,785 B1 * | 3/2010 | Walker | 342/26 D |
| 7,696,921 B1 | 4/2010 | Finley et al. | 342/26 |
| 7,889,118 B1 | 2/2011 | Finley et al. | 342/118 |
| 8,004,458 B2 * | 8/2011 | Walker | 342/174 |
| 8,098,189 B1 * | 1/2012 | Woodell et al. | 342/26 R |
| 8,558,735 B2 * | 10/2013 | Bachmann et al. | 342/188 |
| 2003/0156060 A1 * | 8/2003 | Revankar et al. | 342/372 |
| 2005/0012655 A1 * | 1/2005 | Lalezari et al. | 342/62 |
| 2005/0156780 A1 * | 7/2005 | Bonthron et al. | 342/107 |
| 2005/0164648 A1 * | 7/2005 | Gannholm | 455/84 |
| 2007/0069941 A1 * | 3/2007 | Pearlman et al. | 342/26 B |
| 2008/0169973 A1 * | 7/2008 | Pluymers et al. | 342/175 |
| 2008/0204350 A1 * | 8/2008 | Tam et al. | 343/872 |
| 2009/0295620 A1 * | 12/2009 | Greendale et al. | 342/28 |
| 2009/0295627 A1 * | 12/2009 | Venkatachalam et al. | 342/26 R |
| 2009/0315762 A1 * | 12/2009 | Venkatachalam et al. | 342/26 R |
| 2009/0322610 A1 * | 12/2009 | Hants et al. | 342/372 |
| 2010/0052987 A1 * | 3/2010 | Weinstein | 342/372 |
| 2011/0018757 A1 * | 1/2011 | Mizutani et al. | 342/26 R |
| 2011/0063161 A1 * | 3/2011 | Ishizawa et al. | 342/159 |
| 2011/0102249 A1 * | 5/2011 | Venkatachalam et al. | 342/26 R |
| 2011/0109507 A1 * | 5/2011 | Warnick | 342/368 |
| 2011/0285582 A1 * | 11/2011 | Zhang et al. | 342/26 R |
| 2012/0038504 A1 * | 2/2012 | Yu et al. | 342/81 |
| 2012/0044105 A1 * | 2/2012 | Bachmann et al. | 342/188 |
| 2012/0139779 A1 * | 6/2012 | Pujol et al. | 342/26 B |
| 2014/0062792 A1 * | 3/2014 | Schantz et al. | 342/451 |

OTHER PUBLICATIONS

Mackenzie, Anne I, et al., Characterization of Urban Ground Clutter With New Generation Airborne Doppler Weather Radar; Radar Conference, p. 51-56, 1993.

Vignal, Bertrand et al., Identification of Vertical Profiles of Reflectivity from Volume Scan Radar Data, Journal of Applied Meteorology, vol. 38, p. 1214-1228, Aug. 1999.

Kirkpatrick, George M., The Design and Test of an Electronic Scan Weather Radar for Light Aircraft, IEEE International Radar Conference, cover page and p. 463-468, Apr. 21-23, 1975.

Steiner, Matthias et al., Use of Three-Dimensional Reflectivity Structure for Automated Detection and Removal of Nonprecipitating Echoes in Radar Data, American Meteorological Society, vol. 19, p. 673-686, May 2002.

U.S. Appl. No. 13/478,988, filed May 23, 2012 entitled Transmit/Receive Module for Electronically Steered Weather Radar.

* cited by examiner

ELECTRONICALLY STEERED WEATHER RADAR

RELATED APPLICATIONS

This non-provisional patent application claims priority benefit to earlier-filed U.S. Provisional Application No. 61/489,485, entitled "ELECTRONICALLY-STEERED WEATHER RADAR," filed May 24, 2011, which is herein incorporated by reference into the present application in its entirety.

BACKGROUND

A weather radar system generally detects the weather that is occurring in front of an aircraft, typically along its flight path. The weather radar system is usually positioned in the forward section of the aircraft and may include an antenna, an antenna position element, a transmitter, a receiver, and a signal processing element. The transmitter may generate a signal for the antenna to transmit forward of the aircraft. The antenna may also receive the signal after it has been reflected from clouds or other meteorological formations in front of the aircraft. The receiver may amplify the reflected signal and the signal processing element may prepare the reflected signal to be received by other equipment, such as a display monitor. The antenna may be oriented to transmit or receive in a given direction or may be swept in either azimuth or elevation by the antenna position element.

SUMMARY

Conventional aircraft weather radar systems may include mechanisms to steer an antenna. The mechanisms typically include moving parts which add weight to the aircraft and are prone to wear and reliability problems. In addition, the moving parts may require clearance on the aircraft for the range of motion. Furthermore, the mechanisms may be slow to move the antenna over large angles of motion, thereby having difficulty quickly scanning different areas of the sky.

Embodiments of the present technology provide an electronically steered weather radar system comprising a plurality of transmit/receive modules, a plurality of antenna modules, and a system signal processor. Each transmit/receive module may be configured to adjust the phase of a radio frequency (RF) signal to be transmitted and received. Each antenna module may be in communication with one transmit/receive module. The antenna modules may form an antenna array configured to transmit a system beam in a direction determined by the phase of the RF signal from each transmit/receive module and to generate the RF signal from the received system beam. The system signal processor may be configured to perform a first scan to detect meteorological formations wherein the system signal processor communicates with each transmit/receive module to adjust a phase characteristic of the RF signals such that the antenna array transmits and receives the system beam through a plurality of azimuth angles and a plurality of elevation angles.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present technology will be apparent from the following detailed description of the embodiments and the accompanying drawing figures.

BRIEF DESCRIPTION OF THE DRAWING FIGURES

Embodiments of the present technology is described in detail below with reference to the attached drawing figures, wherein.

Figure 1:
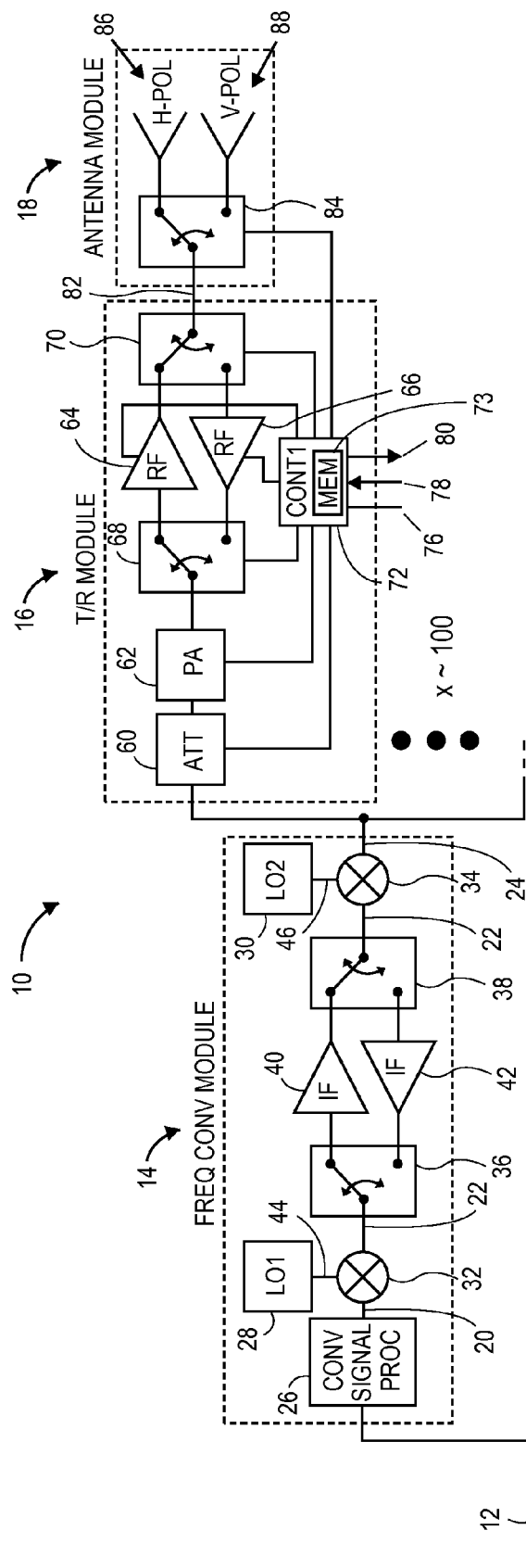
FIG. 1 is a schematic block diagram of an electronically steered weather radar system constructed in accordance with various embodiments of the present technology.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology provide a weather radar system for use primarily with aircraft that includes an electronically steerable system beam. The system may comprise an antenna array that includes a plurality of antenna elements, each configured to transmit a beam corresponding to a radio frequency (RF) signal. The beams of the antenna elements may combine through constructive wave interference to form the system beam. The system may control a phase characteristic of each RF signal, such as the phase, frequency, and/or amplitude of each RF signal, in order to steer, or control the direction of, the system beam. The antenna elements may also receive the system beam and generate an RF signal for each antenna element. The direction in which the system beam is received may be determined by controlling the phase of the generated RF signals.

Embodiments of the technology will now be described in more detail with reference to the drawing figures. Referring initially to FIG. 1, an electronically steered weather radar system 10 of the present technology for use with an aircraft is shown and may broadly comprise a system signal processor 12, an array of frequency conversion modules 14, an array of transmit/receive modules 16, and an array of antenna modules 18. The system 10 generally transmits an electronically steered beam and receives the beam after the beam has reflected from clouds or other meteorological formations. Thus, the system 10 may include a transmit mode, in which the components, described in more detail below, are configured to transmit the beam from a transmit signal, and a receive mode, in which the components are configured to receive the beam and generate a receive signal.

Figure 7:
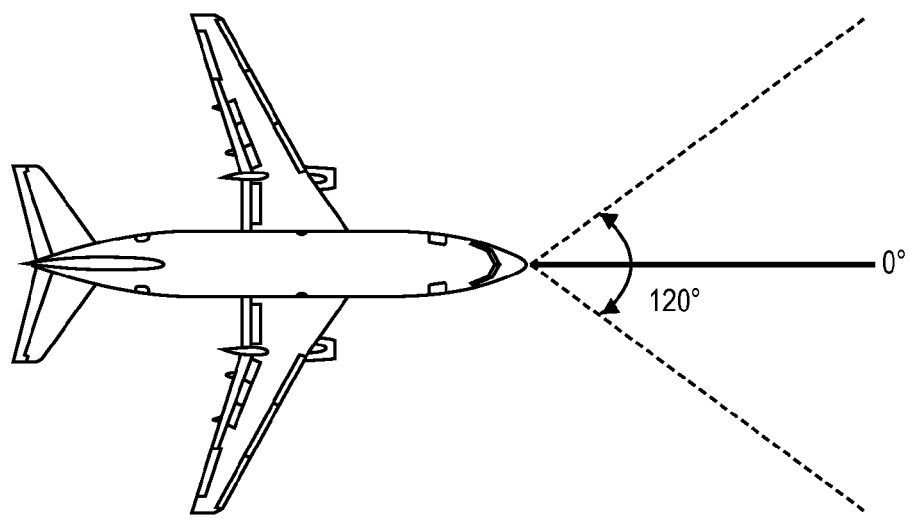
FIG. 7 is a top view of the aircraft with the electronically steered weather radar system indicating the azimuth range of the system beam.
Figure 8:
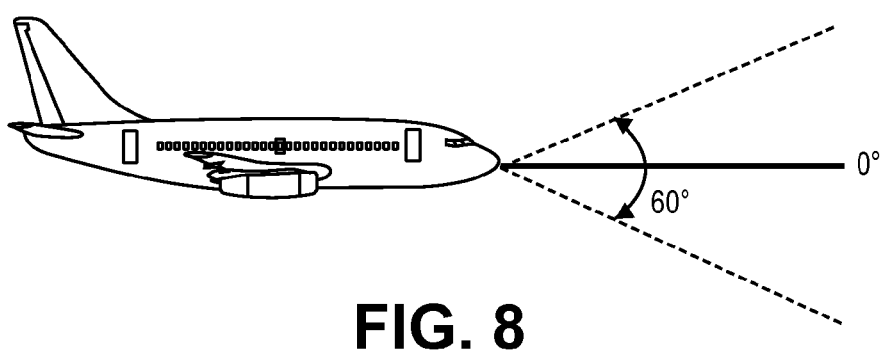
FIG. 8 is a side view of the aircraft with the electronically steered weather radar system indicating the elevation range of the system beam.

The terms "azimuth" and "elevation" may be used throughout the specification and may retain their commonly-known definitions, wherein azimuth refers to an orientation in a horizontal plane and may include the directions left and right with respect to the aircraft, and elevation refers to an orientation in a vertical plane and may include the directions up or above and down or below with respect to the aircraft. Generally, 0 degrees in azimuth indicates a vertical plane through the center of the aircraft, as shown in FIG. 7, and negative azimuth is in the direction of the left or port side of the aircraft, while positive azimuth is in the right or starboard direction. Zero degrees elevation indicates a horizontal plane through the center of the aircraft, as shown in FIG. 8. Positive elevation is above the aircraft, while negative elevation is below.

The system signal processor 12 may include processors, microprocessors, digital signal processors (DSPs), microcontrollers, field-programmable gate arrays (FPGAs), application-specific integrated circuits (ASICs), or the like, or combinations thereof. The system signal processor 1A may determine whether the system 1A is in the transmit mode or the receive mode. The system signal processor 12 may analyze or sum a baseband signal 20 from each frequency conversion module 14 when the system 10 is in the receive mode, as described in more detail below. The baseband signal 20 may have a baseband frequency, hereinafter "baseband", level and may include the range of frequencies from kilohertz (kHz) to hundreds of MHz. The system signal processor 12 may also generate signals for the transmit/receive modules 16 to store configuration settings specific to each transmit/receive module 16.

The frequency conversion module 14 generally performs a frequency upconversion when the system 10 is in the transmit mode and a frequency downconversion when the system 10 is in the receive mode. During the upconversion process, the frequency conversion module 14 may convert the frequency of the baseband signal 20 in stages from a baseband level to an intermediate frequency (IF) level and then to a radio frequency (RF) level. After the first upconversion, the baseband signal 20 may become an IF signal 22. The RF level may include the frequency range from gigahertz (GHz) to tens of GHz and may be in the X band region of the microwave range of the electromagnetic spectrum, broadly covering approximately 7 GHz to approximately 12 GHz. In various embodiments, the RF level may include the range of approximately 9.3 GHz to approximately 9.5 GHz. After the second upconversion, the IF signal 22 may become an RF signal 24. During the downconversion process, the frequency conversion module 14 may convert the frequency of the RF signal 24 in stages from the RF level down to the IF level, wherein the RF signal 24 becomes the IF signal 22, and then to the baseband level, wherein the IF signal 22 becomes the baseband signal 20. The baseband signal 20 may be communicated to and from the system signal processor 12. The RF signal 24 may be communicated to and from the transmit/receive modules 16.

In various embodiments, there may be four frequency conversion modules 14 in the system 10. During normal operation, the four frequency conversion modules 14 are all configured in the same manner and perform the same functions and operations. For example, when the system 10 is in the transmit mode all of the frequency conversion modules 14 are configured to perform the upconversion, and when the system 10 is in the receive mode, all of the frequency conversion modules 14 are configured for downconversion.

The frequency conversion module 14 may include a conversion signal processor 26, a first local oscillator 28, a second local oscillator 30, a first mixer 32, a second mixer 34, a first switch 36, a second switch 38, a transmit IF amplifier 40, and a receive IF amplifier 42.

The conversion signal processor 26 may include processors, microprocessors, DSPs, microcontrollers, FPGAs, ASICs, or the like, or combinations thereof. The conversion signal processor 26 may generate the baseband signal 20 that is frequency upconverted and ultimately transmitted by the antenna modules 18. Generally, each conversion signal processor 26 generates the same baseband signal 20, with regard to amplitude, frequency, phase, etc. The conversion signal processor 26 may also sum or at least partially sum the baseband signals 20 that are frequency downconverted from signals received by the antenna modules 18, as described in more detail below.

The first local oscillator 28 may generate an IF level signal. The first local oscillator 28 may include components that are capable of generating an oscillating periodic signal, such as crystal oscillators, oscillator circuits, voltage-controlled oscillator circuits, multivibrator circuits, programmable digital signal processors or digital synthesizers with digital to analog converters, or the like, or combinations thereof. The first local oscillator 28 may generate a first local oscillator signal 44 to be mixed by the first mixer 32.

The second local oscillator 30 may generate an RF level signal. Like the first local oscillator 28, the second local oscillator 30 may include components that are capable of generating an oscillating periodic signal, such as crystal oscillators, oscillator circuits, voltage-controlled oscillator circuits, multivibrator circuits, programmable digital signal processors or digital synthesizers with digital to analog converters, or the like, or combinations thereof. The second local oscillator 30 may generate a second local oscillator signal 46 signal to be mixed by the second mixer 34.

Figure 2:
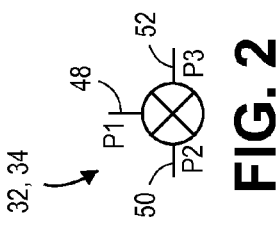
FIG. 2 is a block diagram of a mixer component of the electronically steered weather radar system.

The first mixer 32 generally performs frequency conversion of a signal, either upconversion from a baseband level to an IF level when the system 10 is in the transmit mode, or downconversion from an IF level to a baseband level when in the receive mode. The first mixer 32 may include electronic signal mixing components known in the art, such as active devices including diodes, transistors, or the like, and passive components including resistors or the like, as well as combinations thereof. The first mixer 32, as shown in FIG. 2, may include a first port 48, a second port 50, and a third port 52. The first port 48 may be coupled to the first local oscillator 28, the second port 50 may be coupled to the conversion signal processor 26, and the third port 52 may be coupled to the first switch 36. When the first mixer 32 is upconverting, the conversion signal processor 26 and the first local oscillator 28 may act as inputs and the first switch 36 may receive the output of the first mixer 32, which may have a frequency that is the sum of the frequencies of the baseband signal 20 and the first local oscillator signal 44. When the first mixer 32 is downconverting, the first switch 36 and the first local oscillator 28 may act as inputs and the conversion signal processor 26 may receive the output of the first mixer 32, which may have a frequency that is the difference of the frequencies of the first local oscillator signal 44 and the IF signal 22. In some configurations, the processor 12 may directly sum the received RF signals 24 instead of the baseband signal 20.

Figure 3:
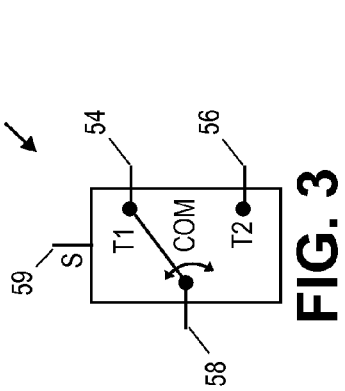
FIG. 3 is a block diagram of a switch component of the electronically steered weather radar system.

The second mixer 34 generally performs frequency conversion of a signal, either upconversion from an IF level to an RF level when the system 10 is in the transmit mode, or downconversion from an RF level to an IF level when in the receive mode. Like the first mixer 32, the second mixer 34 may include electronic signal mixing components known in the art, such as active devices including diodes, transistors, or the like, and passive components including resistors or the like, as well as combinations thereof. Furthermore, the second mixer 34 may have the structure as shown in FIG. 3. The first port 48 of the second mixer 34 may be coupled to the second local oscillator 30, the second port 50 may be coupled to the second switch 38, and the third port 52 may be coupled to the transmit/receive modules 16. When the second mixer 34 is upconverting, the second switch 38 and the second local oscillator 30 may act as inputs and the transmit/receive modules 16 may receive the output of the second mixer 34, which may have a frequency that is the sum of the frequencies of the IF signal 22 and the second local oscillator signal 46. When the second mixer 34 is downconverting, the transmit/receive modules 16 and the second local oscillator 30 may act as inputs and the second switch 38 may receive the output of the second mixer 34, which may have a frequency that is the difference of the frequencies of the second local oscillator signal 46 and the RF signal 24.

The transmit IF amplifier 40 generally amplifies the IF signal 22 when the system 10 is in the transmit mode. The transmit IF amplifier 40 may comprise electronic signal amplifier circuits including active and passive devices, operational amplifiers, single stage or multi stage circuits, or the like, or combinations thereof. An exemplary transmit IF amplifier 40 is a power amplifier. In various embodiments, the transmit IF amplifier 40 may have a fixed gain, although variable gain amplifiers may be used. The transmit IF amplifier 40 may be coupled to the first and second switches 36, 38 such that the transmit IF amplifier 40 amplifies the IF signal 22 when the system 10 is in the transmit mode and is disconnected from the IF signal 22 path when in the receive mode.

The receive IF amplifier 42 generally amplifies the IF signal 22 when the system 10 is in the receive mode. The receive IF amplifier 42 may comprise electronic signal amplifier circuits including active and passive devices, operational amplifiers, single stage or multi stage circuits, or the like, or combinations thereof. An exemplary receive IF amplifier 42 is a small-signal, low-noise amplifier. In various embodiments, the receive IF amplifier 42 may have a fixed gain, although variable gain amplifiers may be used. The receive IF amplifier 42 may be coupled to the first and second switches 36, 38 such that the receive IF amplifier 42 amplifies the IF signal 22 when the system 10 is in the receive mode and is disconnected from the IF signal 22 path when in the transmit mode.

The first switch 36 and the second switch 38 generally select between the transmit IF amplifier 40 and the receive IF amplifier 42. The first switch 36 and the second switch 38 may be substantially similar in structure and function to one another and may include electronic switching components, such as transistors, relays, or the like. The first and second switches 36, 38 may be of single pole, double throw type and each one may include, as shown in FIG. 3, a first terminal 54, a second terminal 56, and a common terminal 58 that contacts either the first terminal 54 or the second terminal 56. The first and second switches 36, 38 may also each include a select line 59 that sets the switch in either a first position, in which contact is made between the first terminal 54 and the common terminal 58, or a second position, in which contact is made between the second terminal 56 and the common terminal 58. The common terminal 58 of the first switch 36 may be coupled to the first mixer 32, the first terminal 54 may be coupled to the input of the transmit IF amplifier 40, and the second terminal 56 may be coupled to the output of the receive IF amplifier 42. The common terminal 58 of the second switch 38 may be coupled to the second mixer 34, the first terminal 54 may be coupled to the output of the transmit IF amplifier, and the second terminal 56 may be coupled to the input of the receive IF amplifier 42. The first and second switches 36, 38 are generally to set to the same position so that when the system 10 is in the transmit mode, the IF signal 22 path from the first mixer 32 to the second mixer 34 is through the transmit IF amplifier 40. And, when the system 10 is in the receive mode, the IF signal 22 path from the second mixer 34 to the first mixer 32 is through the receive IF amplifier 42.

The transmit/receive module 16 generally amplifies and adjusts a phase characteristic of the RF signal 24 in both the transmit mode and the receive mode. When in the transmit mode, the RF signal 24 is to be transmitted by one of the antenna modules 18. When in the receive mode, the RF signal 24 is generated by one of the antenna modules 18. The transmit/receive module 16 may include an attenuator 60, a phase shifter 62, a transmit RF amplifier 64, a receive RF amplifier 66, a third switch 68, a fourth switch 70, and a controller 72. In various embodiments, the frequency conversion module 14 may drive approximately one hundred transmit/receive modules 16. Thus, the system 10 may include approximately four hundred transmit/receive modules 16.

The attenuator 60 generally attenuates or adjusts the amplitude of the RF signal 24. The attenuator 60 may include variable gain amplifier circuits, operational amplifiers, or the like, or combinations thereof. The attenuator 60 may also include an input to set the gain that is applied to the RF signal 24.

The phase shifter 62 generally adjusts a phase characteristic, such as phase, of the RF signal 24 for each transmit/receive module 16. The phase shifter 62 may include electronic circuitry such as passive and active devices, operational amplifiers, DSPs, or the like, or combinations thereof. The phase shifter 62 may also be programmable or have settings, such as the amount of phase change that the RF signal 24 receives, that can vary and may include an input to select the settings. The phase shifter 62 may adjust the phase of the RF signal 24 any amount, such as for example between 0 degrees, 360 degrees, 720 degrees, and the like. In other embodiments, the phase shifter 62 may include signal delaying components that delay the RF signal 24 by a programmable amount of time. The phase shifter 62 may additionally or alternatively adjust the amplitude and/or frequency of the RF signal 24.

The transmit RF amplifier 64 generally amplifies the RF signal 24 when the system 10 is in the transmit mode. The transmit RF amplifier 64 may comprise electronic signal amplifier circuits including active and passive devices, single stage or multi stage circuits, or the like, or combinations thereof. An exemplary transmit RF amplifier 64 is a power amplifier. In various embodiments, the transmit RF amplifier 64 may have a fixed gain, although variable gain amplifiers may be used. In various embodiments, the transmit RF amplifier 64 may be turned on and off by a control line 74. The transmit RF amplifier 64 may be coupled to the third and fourth switches 68, 70 such that the transmit RF amplifier 64 amplifies the RF signal 24 when the system 10 is in the transmit mode and is disconnected from the RF signal 24 path when in the receive mode.

The receive RF amplifier 66 generally amplifies the RF signal 24 when the system 10 is in the receive mode. The receive RF amplifier 66 may comprise electronic signal amplifier circuits including active and passive devices, single stage or multi stage circuits, or the like, or combinations thereof. An exemplary receive RF amplifier 66 is a small-signal, low-noise amplifier. In various embodiments, the receive RF amplifier 66 may have a fixed gain, although variable gain amplifiers may be used. The receive RF amplifier 66 may be coupled to the third and fourth switches 68, 70 such that the receive RF amplifier 66 amplifies the RF signal 24 when the system 10 is in the receive mode and is disconnected from the RF signal 24 path when in the transmit mode.

The third switch 68 and the fourth switch 70 generally select between the transmit RF amplifier 64 and the receive RF amplifier 66. The third and fourth switches 68, 70 may both have the structure shown in FIG. 3. The common terminal 58 of the third switch 68 may be coupled to the phase shifter 62, the first terminal 54 may be coupled to the input of the transmit RF amplifier 64, and the second terminal 56 may be coupled to the output of the receive RF amplifier 66. The common terminal 58 of the fourth switch 70 may be coupled to the antenna module 18, the first terminal 54 may be coupled to the output of the transmit RF amplifier, and the second terminal 56 may be coupled to the input of the receive RF amplifier 66. The third and fourth switches 68, 70 are generally set to the same position so that when the system 10 is in the transmit mode, the RF signal 24 path from the phase shifter 62 to the antenna module 18 is through the transmit RF amplifier 64. And, when the system 10 is in the receive mode, the RF signal 24 path from the antenna module 18 to the phase shifter 62 is through the receive RF amplifier 66.

The controller 72 generally manages the operation of the transmit/receive module 16. The controller 72 may include components that are capable of executing computer programs, applications, software, code, instructions, algorithms, or firmware, and combinations thereof. The controller 72 may include circuitry, such as finite state machines (FSMs), that automatically performs instructions. The controller 72 may also include processors, microprocessors, microcontrollers, FPGAs, ASICs, combinations thereof, or the like, and may be implemented using hardware description languages (HDLs), such as Verilog and VHDL. An exemplary controller 72 includes an IGLOO nano FPGA manufactured by Microsemi SoC Products Group in Mountain View, Calif. Furthermore, the controller 72 may be electronically coupled to, or in electronic communication with, a data storage component 73 such as read-only memory (ROM), random-access memory (RAM), cache memory, floppy disks, hard-disk drives, optical storage media such as compact discs (CDs or CDROMs), digital video disc (DVD), Blu-Ray™, etc., flash memory, combinations thereof, or the like. The IGLOO nano FPGA may include a data storage component 73 such as embedded RAM or FLASH ROM memory storage. The data storage component 73 may also be known as a "computer-readable storage medium" and may be operable to store the computer programs, applications, software, code, instructions, algorithms, or firmware that are executed by the controller 72. The data storage component 73 may also store configuration settings, data, signals that are either transmitted or received, or the like.

The controller 72 may include outputs to change the settings of the attenuator 60, the phase shifter 62, the transmit RF amplifier 64, the receive RF amplifier 66, the third switch 68, and the fourth switch 70.

The controller 72 may further include a boundary scan, or joint test action group (JTAG), capability that follows the IEEE Standard 1149.1. The boundary scan is a serially accessible scan path through the circuitry of the controller 72 that is generally used for testing purposes. Typically, the boundary scan accesses the inputs and outputs of the controller 72 so that both the inputs and the outputs can be controlled and observed. The exemplary IGLOO nano FPGA controller 72 may also include FLASH ROM memory writing capability in the boundary scan. The boundary scan usually requires at least three additional ports on the controller—a first port for a scan clock 76, a second port for a scan input 78, and a third port for a scan output 80. The boundary scanning process may include placing the controller 72 in a scanning mode, shifting data into the scan input 78, and reading data from the scan output 80, wherein one bit of data is shifted in and one bit of data is read out for every period of the scan clock 76. Within the controller 72, the data shifted into the scan input 78 may be stored in the FLASH ROM. The same data may be read out from the scan output 80.

The system 10 may be calibrated to achieve optimal performance for a given physical implementation, such as the positioning of the antenna modules 18, of the system 10. The calibration may include certain parameter settings for the attenuator 60 and the phase shifter 62. These settings may be stored in the data storage components associated with the controller 72, such as the FLASH ROM in the IGLOO nano FPGA.

The transmit/receive modules 16 may also include a scan chain that is formed by the scan output 80 of one controller 72 being connected to the scan input 78 of an adjacent controller 72. In addition, the scan clocks 76 of all the controllers 72 are connected together. The scan chain may receive a data stream that includes parameter settings for the components of the transmit/receive modules 16 to be stored in the FLASH ROM of each controller 72. During a boundary scanning process of the transmit/receive modules 16, the data stream with the parameter settings may be shifted into the scan input 78 of the first controller 72 in the scan chain, and data may be read out from the scan output 80 of the last controller 72 in the scan chain, with the data stream traveling through every controller 72. The order of the FLASH ROM data for each controller 72 in the data stream corresponds to the order of the controllers 72 in the scan chain.

The antenna module 18 may include an antenna signal 82, a fifth switch 84, a horizontally polarized antenna 86, and a vertically polarized antenna 88. There may be one antenna module 18 coupled to each transmit/receive module 16. Thus, there may be a total of approximately four hundred antenna modules 18 in the system 10.

The antenna signal 82 serves as the main signal to and from the antenna module 18 and may couple with the RF signal 24 from the transmit/receive module 16. The antenna module 18 generally converts the antenna signal 82 into radio waves when transmitting and converts radio waves into the antenna signal 82 when receiving.

The fifth switch 84 generally selects between the horizontally polarized antenna 86 and the vertically polarized antenna 88. The fifth switch 84 may have a structure as shown in FIG. 3. The common terminal 58 may be coupled to the transmit/receive module 16, the first terminal 54 may be coupled to the horizontally polarized antenna 86, and the second terminal 56 may be coupled to the vertically polarized antenna 88. The fifth switch 84 may couple the antenna signal 82 to the horizontally polarized antenna 86 when the fifth switch 84 is in the first position and may couple the antenna signal 82 to the vertically polarized antenna 88 when the fifth switch 84 is in the second position.

The horizontally polarized antenna 86 may include radiating elements that are designed to operate in the X band frequency range. Various embodiments of the horizontally polarized antenna 86 may include a patch antenna oriented or configured to transmit and receive radio waves with a horizontal polarization.

The vertically polarized antenna 88 may also include radiating elements that are designed to operate in the X band frequency range. Various embodiments of the vertically polarized antenna 88 may include a patch antenna oriented or configured to transmit and receive radio waves with a vertical polarization. In some embodiments, the vertically polarized antenna 88 may be combined with the horizontally polarized antenna 86.

Figure 4:
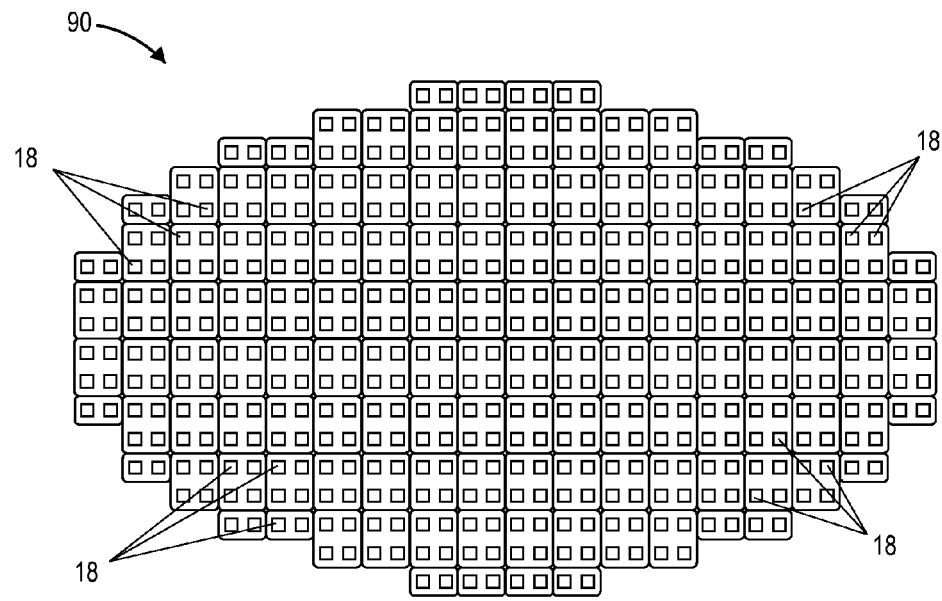
FIG. 4 is a top view of an antenna array of the electronically steered weather radar system.

The plurality of antenna modules 18 may be integrated in a single structure to form an antenna array 90. An exemplary implementation of the antenna array 90 is shown in FIG. 4 wherein the antenna modules 18 may be distributed in rows and columns on one or more substrates, such as a printed circuit board, ceramic base, or other material. Each antenna module 18 may be embedded or otherwise attached to the substrate. In the embodiment of FIG. 4, the rows of antenna modules 18 in the array 90 may be arranged in parallel. However, the antenna modules 18 may be positioned in any configuration on the substrate. The antenna array 90 may be installed in a forward-pointing portion of an aircraft, typically on the exterior of the nose of the aircraft.

Each antenna module 18 in the antenna array 90 may transmit and receive an individual beam 92. However, the plurality of transmit/receive modules 16 and antenna modules 18 may function as a single transmitting and receiving unit if each transmit/receive module 16 is properly programmed. When the system 10 is transmitting, the transmit IF amplifier 40 and the transmit RF amplifier 64 are powered, and the receive IF amplifier 42 and the receive RF amplifier 66 are not powered. The beam 92 for at least a first antenna module 18 may be generated at an arbitrary time referred to as time zero. The beams 92 for at least a portion of the other antenna modules 18 may be generated out of phase with respect to the beam 92 from the first antenna module 18. The phase and/or other phase characteristic of each beam 92 may be set by phase shifter 62 of each transmit/receive module 16, which adjusts the phase and/or other phase characteristic of the RF signal 24 that, in turn, is radiated by the antenna module 18. The wave-like nature of the transmitted beams 92 from all of the antenna modules 18 creates constructive and destructive interference patterns in space, such that in at least one direction constructive interference creates a system beam 94, while in other directions destructive interference cancels, or at least strongly attenuates, the other beams 92.

Figure 5:
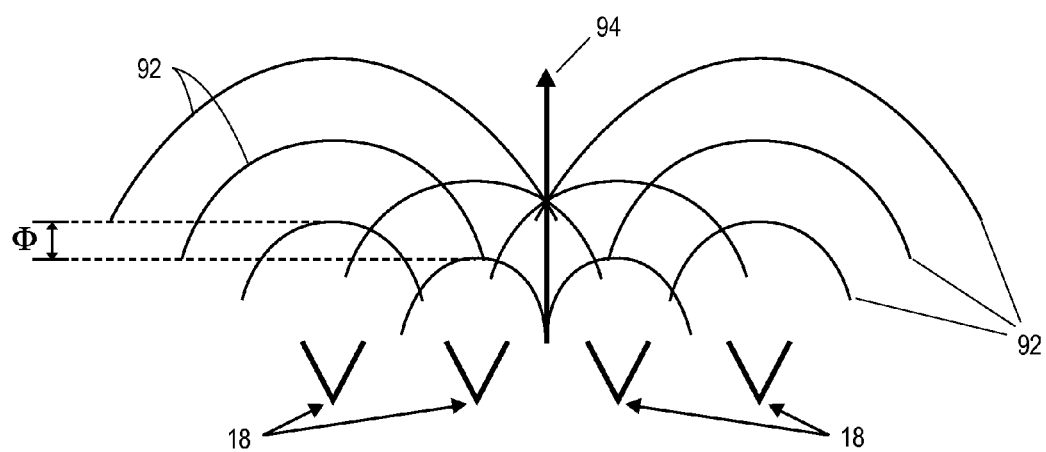
FIG. 5 is a view of antenna modules of the antenna array forming a system beam.

This phenomenon is illustrated in FIG. 5, which shows four antenna modules 18 from the antenna array 90, with each antenna module 18 generating a beam 92. The wavefronts of each beam 92 are shown as arcuate lines. The difference between the wavefronts of adjacent beams 92 is the phase, shown as $\Phi$, between the beams 92, which is set by the phase shifter 62 of each transmit/receive module 16. In the illustrated example, the constructive interference of the beams 92 creates the system beam 94 in a direction that is at an angle of approximately 90 degrees with respect to the antenna modules 18.

Figure 6:
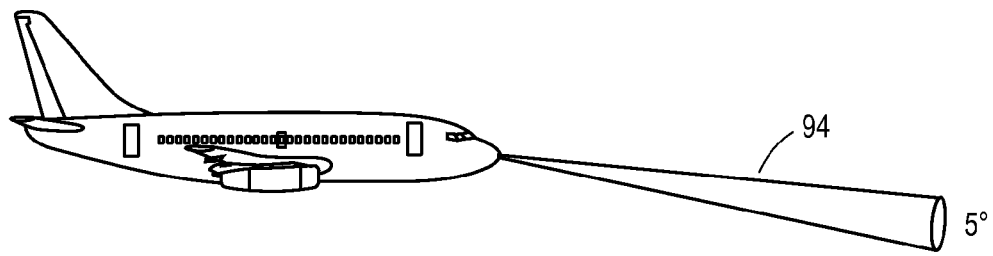
FIG. 6 is a side view of an aircraft with the electronically steered weather radar system transmitting the system beam.

Although the radio wave output of the system 10 is shown in FIG. 5 as a single system beam 94, in reality there may be sidelobes to the system beam 94 that are produced as well. But the system beam 94 as shown includes most of the power that is produced by the antenna array 90, and thus a single system beam 94 will be discussed hereinafter. Furthermore, the system beam 94 may be considered to have a conical shape, as shown in FIG. 6. The angle of the cone may be referred to as the beamwidth. In various embodiments, the beamwidth may be approximately 5 degrees. In addition, the adjustment of the system beam 94 generally sets the direction of the center of the beam.

The direction of the system beam 94 may be changed by changing the phase between the beams 92. By properly setting the phase and/or other phase characteristic in the phase shifter 62 of each transmit/receive module 16, the direction of the system beam 94 may be adjusted both in azimuth and elevation. The range of azimuth angles in which the system beam 94 is directed, as shown in FIG. 7, may be approximately 120 degrees or approximately −60 degrees to approximately +60 degrees, although other ranges are possible. The range of elevation angles in which the system beam 94 is directed, as shown in FIG. 8, may be approximately 60 degrees or approximately −30 degrees to approximately +30 degrees, although other ranges are possible. Furthermore, the direction of the system beam 94 may be changed by large values in both azimuth and elevation without having to be set to intervening values. For example, the system beam 94 may be adjusted to 30 degrees azimuth, 20 degrees elevation in a first setting. The system beam 94 may then be adjusted −10 degrees azimuth, −15 degrees elevation in a second setting without adjusting to any values there between.

The system beam 94 may be transmitted from the antenna array 90 into the space in front of the aircraft and may reflect off of clouds or other meteorological formations, as well as other aircraft and ground formations such as trees, buildings, hills, mountains, or the like. Typically, the system beam 94 reflects off of objects and is received by the antenna array 90 in the same direction at which it was transmitted from the antenna array 90.

When the system 10 is receiving, similar phase shifting techniques may be utilized to determine the direction at which electromagnetic radiation is received. The phase and/or other phase characteristic of the phase shifter 62 for each transmit/receive module 16 may be set as discussed above for a given direction of the system beam 94. However, in the receive mode, the transmit IF amplifier 40 and the transmit RF amplifier 64 are not powered, and the system beam 94 is not transmitted. Instead, the receive IF amplifier 42 and the receive RF amplifier 66 are powered and all the 36, 38, 68, 70, 84 are set such that electromagnetic radiation received by the antenna module 18 is coupled to the antenna signal 82 which in turn is frequency downconverted from the RF signal 24 to the baseband signal 20. The phase of the phase shifter 62 for each transmit/receive module 16 may be adjusted and the baseband signals 20 from the frequency conversion modules 14 are summed together by the system signal processor 12. The sum of the signals may determine the power of the electromagnetic radiation that is present in the direction determined by the phase setting of the phase shifter 62 of all of the transmit/receive modules 16. Generally, the direction of receiving electromagnetic radiation is the same direction as the system beam 94 was transmitted. If the system beam 94 reflected off of an object, then the electromagnetic radiation received likely includes at least some portion of the system beam 94. The power level of the received system beam 94 may depend on a number of factors, such as the distance of the object, the shape of the object, physical characteristics of the object, such as density, radar cross section (RCS), etc.

As with transmitting the system beam 94, when the system 10 is receiving the system beam 94 the direction of the system beam 94 may be changed abruptly from a first setting to a second setting without adjusting the direction to values therebetween. In addition, the system 10 may be configured to transmit the system beam 94 in a first direction and receive the system beam 94 in a second, different direction.

The system 10 may operate as follows. The system 10 may perform a general scan of the space in front of the aircraft on a periodic basis, where the period may be on the order of tens of seconds. The general scan may include setting the elevation angle of the system beam 94 to a value at either the upper end or the lower end of its range and setting the azimuth angle to a value either at the left end or the right end of its range. The antenna array 90 may transmit a pulse of the system beam 94 and detect if the system beam 94 is reflected. The azimuth angle may be stepped (either incremented or decremented) by a first azimuth step value followed by the antenna array 90 transmitting a pulse of the system beam 94 and detecting any reflected beams 92. The system signal processor 12 may change the azimuth angle of the system beam 94 by adjusting the phase of the phase shifter 62 of each transmit/receive module 16, as described above. The azimuth angle may be stepped until it reaches the end of its range, wherein at each step, a pulse is transmitted and reflected beams 92 are detected. Subsequently, the elevation angle may be stepped by a first elevation step value. The system signal processor 12 may also change the elevation angle by adjusting the phase of the phase shifter 62 of each transmit/receive module 16, as described above. The azimuth angle may be set to either the left end or the right end of its range. The process of stepping the azimuth angle through its range and transmitting pulses and detecting beams 92 at each step may be repeated in a raster fashion for each value of the elevation angle until the elevation angle reaches the end of its range. Other methods of rastering the system beam 94 to perform the general scan are also possible.

Figure 9:
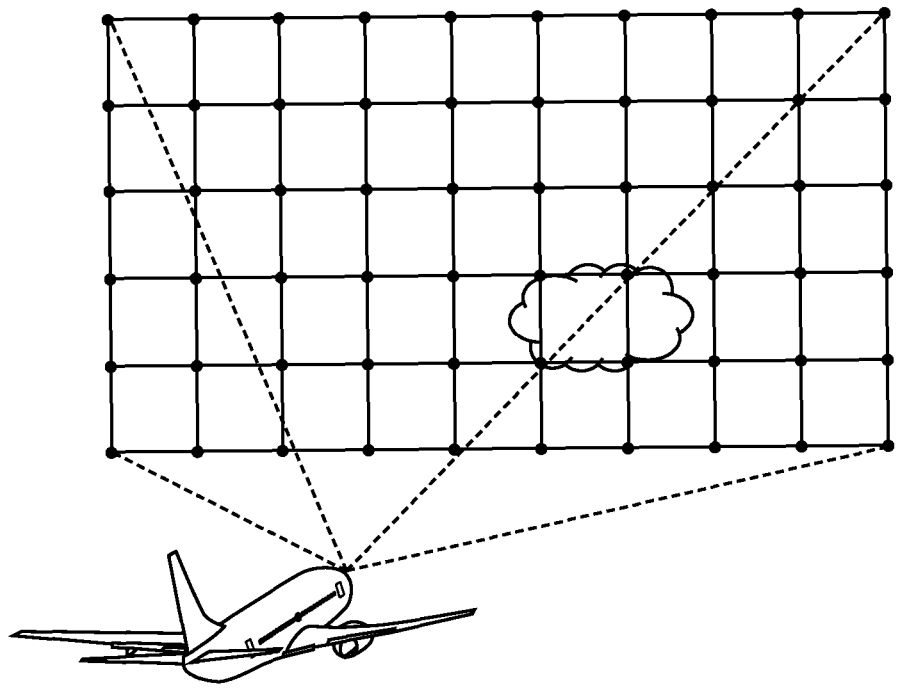
FIG. 9 is a perspective view of the aircraft with the electronically steered weather radar system performing a first scan for meteorological formations.

While scanning, the system 10 may generate the system beam 94 on a grid, such as the one shown in FIG. 9, wherein the upper, lower, left, and right limits of the grid are determined by the range of azimuth and elevation scan angles. The grid points represent the points in space where the system beam 94 is transmitted and received signals are processed. The distance between the grid points represents the azimuth step value and the elevation step value. During a general scan, the grid spacing may be coarse, wherein the azimuth step value and the elevation step value may be integer multiples of the beamwidth, such that there is no overlapping of the system beam 94 during the general scan. In addition, during any scan, the azimuth step value may be different from the elevation step value.

Figure 10:
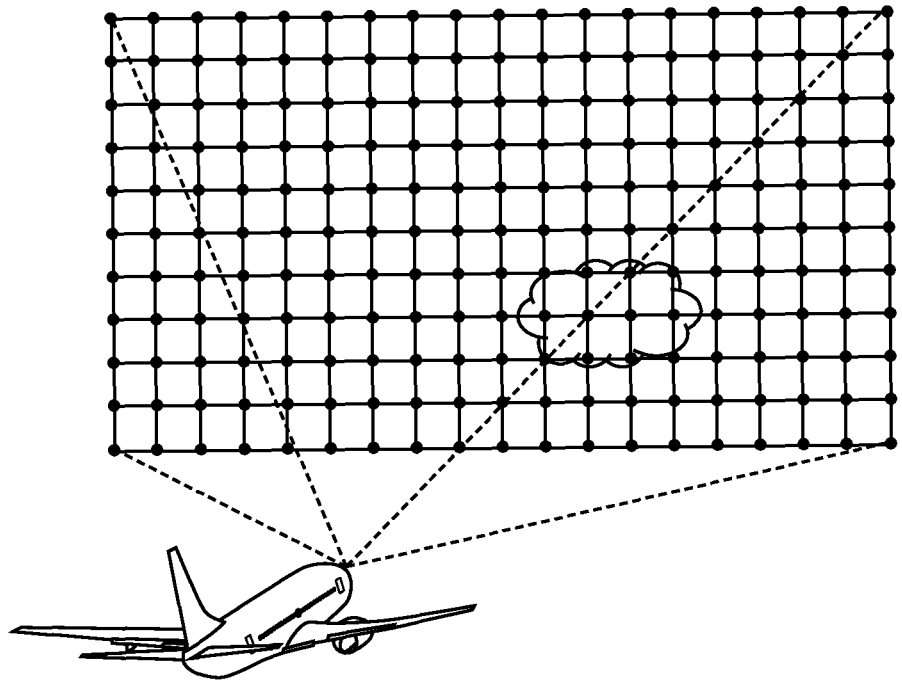
FIG. 10 is a perspective view of the aircraft with the electronically steered weather radar system performing a second scan for meteorological formations.

If the power level of the received signals is above a certain threshold, then a higher resolution scan may be performed, as shown in FIG. 10. The higher resolution scan may also be performed on a periodic basis. During the higher resolution scan, the system 10 may perform the same steps as discussed above for the general scan, except that the azimuth step value and the elevation step value may be equal to or less than the beamwidth. In this fashion, the system beam 94 may overlap itself at each point of the scan.

Figure 11:
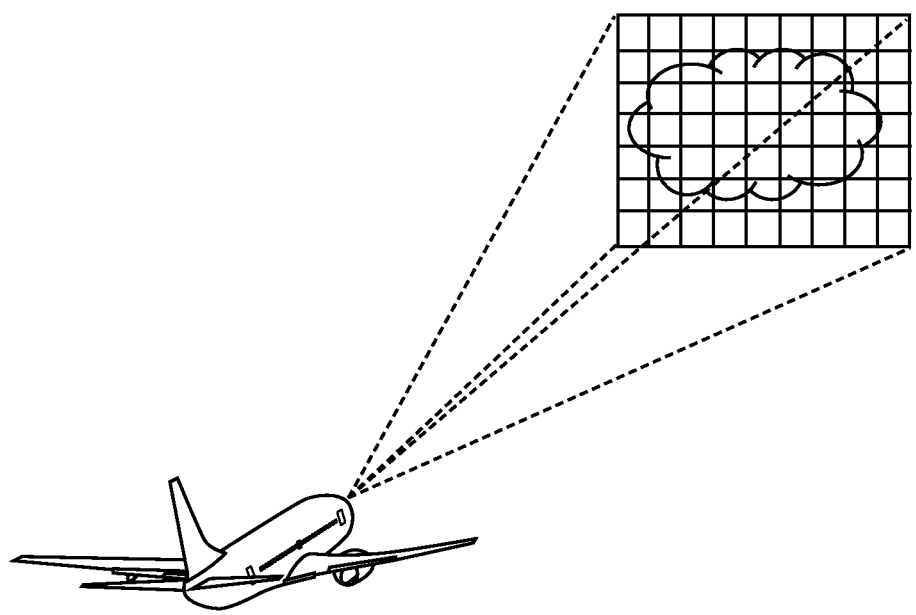
FIG. 11 is a perspective view of the aircraft with the electronically steered weather radar system performing a third scan for meteorological formations.

The system 10 may also perform a selective scan in response to the power level of the received signals being above a certain threshold. The corners of the scan may be just outside of the extents of the area in which higher power levels of the received signals were detected, as shown in FIG. 11. The system 10 may also scan the area at a higher resolution, such that the azimuth step value and the elevation step value may be equal to or less than the beamwidth.

When performing a scan, the system 10 may also determine the range of the scan, wherein the range is the maximum distance away from the aircraft at which the system 10 can detect the reflected system beam 94. The range is determined by the amount of time the system 10 spends in the receive mode after the system beam 94 has been transmitted. Typically, the antenna array 90 transmits the system beam 94 as one or more pulses. Then, the system 10 switches to the receive mode in which the baseband signals 20 are summed by the system signal processor 12 in a repeated fashion. The system 10 may continue to sum the baseband signals 20 for a first period of time equal to the time that it takes the system beam 94 to travel the range distance, for example, 100 nautical miles, reflect off of an object, and return to the system 10 to be received by the antenna array 90. Thus, the system 10 may detect clouds and other meteorological formations at the range distance and less, but not beyond the range distance. After the first period of time has passed, the system 10 may reconfigure the phase shifter 62 of each transmit/receive module 16 to change the direction of the system beam 94 and then transmit the system beam 94. After transmitting the system beam 94, the system 10 switches to the receive mode and the process repeats for each grid point of the scan. The range of the scan, among other factors, may also determine the amount of time it takes to perform a scan. The greater the range distance, the greater the period of time the system 10 has to remain in receive mode for each grid point of the scan. Likewise, the shorter the range distance, the shorter the period of time the system 10 has to remain in receive mode for each grid point of the scan.

By controlling the range distance of the scan, the system 10 may perform a three-dimensional volumetric scan of at least a portion of the space in front of the aircraft. The system 10 may perform a first scan as shown in FIG. 9, 10, or 11 at a first range. The system 10 may increase (or decrease) the range by a range step value and may perform a second scan at the second range distance. The process may continue until the desired number of scans at the desired ranges have been performed.

The system 10 may perform scans while changing the polarization of the system beam 94. Each antenna module 18 includes the horizontally polarized antenna 86 for transmitting and receiving horizontally polarized beams 92 and the vertically polarized antenna 88 for transmitting and receiving vertically polarized beams 92. If all of the antenna modules 18 in the antenna array 90 have the same polarization of antenna selected, then the system beam 94 may have either a horizontal polarization or a vertical polarization. Meteorological formations as well as ground objects reflect horizontally polarized and vertically polarized beams 92 differently.

For example, raindrops, also known as hydrometeors, may flatten and become wider as they are falling through the sky. Consequently, raindrops may reflect more energy from a horizontally-polarized beam 92 than a vertically-polarized beam 92. The system 10 may transmit and receive a horizontally polarized system beam 94 followed by transmitting and receiving a vertically polarized system beam 94, or vice-versa. The received system beams 94 from the two different polarizations may be compared so that differences between the two can be determined.

The system 10 may perform a self test to verify the operation of the frequency conversion modules 14, the transmit/receive modules 16, and the antenna modules 18. The system 10 includes four frequency conversion modules 14, each one coupled to approximately one hundred transmit/receive modules 16, wherein each transmit/receive module 16 is coupled to an antenna module 18. The self test may be utilized with other partitioning schemes of the system 10 as well. A first portion of the frequency conversion modules 14 and the associated transmit/receive modules 16 may be configured to be in the transmit mode, while a second portion of the frequency conversion modules 14 and the associated transmit/receive modules 16 may be configured to be in the receive mode. For example, one frequency conversion module-transmit/receive module 16 combination could be in one mode while the other three frequency conversion module-transmit/receive module 16 combinations are in the other mode. Alternatively, two frequency conversion module-transmit/receive module 16 combinations could be in the transmit mode while the other two frequency conversion module-transmit/receive module 16 combinations are in the receive mode. The first portion may transmit one or more beams 92 that are received by the second portion while the beams 92 are being transmitted. Since the beams 92 that are received should be similar to the beams 92 that were transmitted, the system 10 may determine which frequency conversion modules 14, transmit/receive modules 16, or combinations thereof are not functioning properly.

The system 10 may effectively reduce the width of the system beam 94 by processing the baseband signals 20 that are generated when the system 10 is in receive mode. The system 10 may perform a scan as shown in FIG. 9, 10, or 11. The system signal processor 12 or one or more conversion signal processors 26 may perform a two-dimensional fast Fourier transform (2D FFT) on the received data. The transformed data may be multiplied by the 2D FFT of a filter function that represents an inverse of an impulse response of the antenna array 90. The product may then undergo an inverse 2D FFT to return the data to the time domain. This process may reduce the distortion or other anomalies in the received data as a result of the antenna array 90, thereby having the effect of reducing the width of the system beam 94 or enhancing its resolution.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. An electronically steered weather radar system comprising:
   a plurality of transmit/receive modules, each transmit/receive module configured to adjust a phase characteristic of a radio frequency (RF) signal to be transmitted and received;
   a plurality of antenna modules, each antenna module in communication with one transmit/receive module, the antenna modules forming an antenna array configured to transmit a system beam having a beamwidth in a direction determined by the phase of the RF signal from each transmit/receive module and to generate the RF signal from the received system beam; and
   a system signal processor configured to perform a first scan to detect meteorological formations wherein the system signal processor communicates with each transmit/receive module to adjust a phase characteristic of the RF signals such that the antenna array transmits and receives the system beam through a plurality of azimuth angles with a first azimuth step value and a plurality of elevation angles with a first elevation step value, the first azimuth step value and the first elevation step value being larger than the beamwidth of the system beam.

2. The system of claim 1, wherein the system signal processor is further configured to perform a second scan if meteorological formations are detected such that the antenna array transmits and receives the system beam through a plurality of azimuth angles with a second azimuth step value less than the first azimuth step value and a plurality of elevation angles with a second elevation step value less than the first elevation step value.

3. The system of claim 1, wherein the direction in which the system beam is received is determined by the phase of the RF signal of each transmit/receive module.

4. The system of claim 1, wherein each antenna module includes a horizontally polarized antenna and a vertically polarized antenna and the antenna array is configured to transmit and receive a horizontally polarized system beam and a vertically polarized system beam.

5. The system of claim 4, wherein the antenna array transmits and receives the horizontally polarized system beam followed by the vertically polarized system beam and the system signal processor compares downconverted RF signals from the horizontally polarized system beam with downconverted RF signals from the vertically polarized system beam.

6. The system of claim 1, wherein the system signal processor is further configured to perform a two-dimensional fast Fourier transform (2D FFT) on downconverted RF signals from the first scan, multiply the transformed data by the 2D FFT of a filter function that represents an inverse of an impulse response of the antenna array, and perform an inverse 2D FFT on the product.

7. The system of claim 1, wherein the system signal processor is further configured to perform the first scan at a first range and additional scans wherein the range is changed by at least a first value.

8. The system of claim 7, wherein the range is the distance between the meteorological formations and the antenna modules.

9. The system of claim 1, further including a plurality of frequency conversion modules, each frequency conversion module configured to upconvert a baseband signal to the RF signal and to downconvert the RF signal to the baseband signal, the RF signal being communicated with at least one transmit/receive module.

10. The system of claim 9, wherein the system signal processor is further configured to sum the baseband signals downconverted from the RF signals received from the transmit/receive modules to determine a power level of the received system beam.

11. The system of claim 9, wherein each frequency conversion module includes a conversion signal processor configured to generate the baseband signal that is upconverted to the RF signal and communicated to the transmit/receive module.

12. The system of claim 9, wherein each frequency conversion module includes
a first local oscillator to upconvert the baseband signal to an intermediate frequency (IF) signal and to downconvert the IF signal to the baseband signal, and
a second local oscillator to upconvert the IF signal to the RF signal and to downconvert the RF signal to the IF signal.

13. An electronically steered weather radar system comprising:
a plurality of transmit/receive modules, each transmit/receive module configured to adjust a phase characteristic of a radio frequency (RF) signal to be transmitted and received;
a plurality of antenna modules, each antenna module in communication with one transmit/receive module, the antenna modules forming an antenna array configured to transmit a system beam having a beamwidth in a direction determined by the phase of the RF signal from each transmit/receive module and to generate the RF signal from the received system beam; and
a system signal processor configured to perform a first scan to detect meteorological formations wherein the system signal processor communicates with each transmit/receive module to adjust a phase characteristic of the RF signals such that the antenna array transmits and receives the system beam through a plurality of azimuth angles with a first azimuth step value, a plurality of elevation angles with a first elevation step value, the first azimuth step value and the first elevation step value being integer multiples of the beamwidth of the system beam, and at a first range, and to perform additional scans wherein the range is changed by at least a first value.

14. The system of claim 13, wherein the system signal processor is further configured to perform a second scan if meteorological formations are detected such that the antenna array transmits and receives the system beam through a plurality of azimuth angles with a second azimuth step value less than the first azimuth step value and a plurality of elevation angles with a second elevation step value less than the first elevation step value.

15. The system of claim 13, wherein the range is the distance between the meteorological formations and the antenna modules.

16. The system of claim 13, wherein the direction in which the system beam is received is determined by the phase of the RF signal of each transmit/receive module.

17. The system of claim 13, wherein each antenna module includes a horizontally polarized antenna and a vertically polarized antenna and the antenna array is configured to transmit and receive a horizontally polarized system beam and a vertically polarized system beam.

18. The system of claim 17, wherein the antenna array transmits and receives the horizontally polarized system beam followed by the vertically polarized system beam and the system signal processor compares downconverted RF signals from the horizontally polarized system beam with downconverted RF signals from the vertically polarized system beam.

19. The system of claim 13, wherein the system signal processor is further configured to perform a two-dimensional fast Fourier transform (2D FFT) on downconverted RF signals from the first scan, multiply the transformed data by the 2D FFT of a filter function that represents an inverse of an impulse response of the antenna array, and perform an inverse 2D FFT on the product.

20. The system of claim 13, further including a plurality of frequency conversion modules, each frequency conversion module configured to upconvert a baseband signal to the RF signal and to downconvert the RF signal to the baseband signal, the RF signal being communicated with at least one transmit/receive module.

21. The system of claim 20, wherein the system signal processor is further configured to sum the baseband signals downconverted from the RF signals received from the transmit/receive modules to determine a power level of the received system beam.

22. The system of claim 20, wherein each frequency conversion module includes a conversion signal processor configured to generate the baseband signal that is upconverted to the RF signal and communicated to the transmit/receive module.

23. The system of claim 20, wherein each frequency conversion module includes
a first local oscillator to upconvert the baseband signal to an intermediate frequency (IF) signal and to downconvert the IF signal to the baseband signal, and
a second local oscillator to upconvert the IF signal to the RF signal and to downconvert the RF signal to the IF signal.

24. An electronically steered weather radar system comprising:
a plurality of transmit/receive modules, each transmit/receive module configured to adjust a phase characteristic of a radio frequency (RF) signal to be transmitted and received;
a plurality of antenna modules, each antenna module in communication with one transmit/receive module and including a horizontally polarized antenna and a vertically polarized antenna, the antenna modules forming an antenna array configured to transmit a system beam having a beamwidth in a direction determined by the phase of the RF signal from each transmit/receive module and to generate the RF signal from the received system beam and to transmit and receive a horizontally polarized system beam and a vertically polarized system beam; and
a system signal processor configured to perform a first scan to detect meteorological formations wherein the system signal processor communicates with each transmit/receive module to adjust a phase characteristic of the RF signals such that the antenna array transmits and receives the system beam through a plurality of azimuth angles with a first azimuth step value, a plurality of elevation angles with a first elevation step value, the first azimuth step value and the first elevation step value being larger than the beamwidth of the system beam, and at a first range, and to perform additional scans wherein the range is changed by at least a first value.

25. The system of claim 24, wherein the system signal processor is further configured to perform a second scan if meteorological formations are detected such that the antenna array transmits and receives the system beam through a plurality of azimuth angles with a second azimuth step value less than the first azimuth step value and a plurality of elevation angles with a second elevation step value less than the first elevation step value.

26. The system of claim 24, wherein the range is the distance between the meteorological formations and the antenna modules.

27. The system of claim 24, wherein the direction in which the system beam is received is determined by the phase of the RF signal of each transmit/receive module.

28. The system of claim 24, wherein the antenna array transmits and receives the horizontally polarized system beam followed by the vertically polarized system beam and the system signal processor compares downconverted RF signals from the horizontally polarized system beam with downconverted RF signals from the vertically polarized system beam.

29. The system of claim 24, wherein the system signal processor is further configured to perform a two-dimensional fast Fourier transform (2D FFT) on downconverted RF signals from the first scan, multiply the transformed data by the 2D FFT of a filter function that represents an inverse of an impulse response of the antenna array, and perform an inverse 2D FFT on the product.

30. The system of claim 24, further including a plurality of frequency conversion modules, each frequency conversion module configured to upconvert a baseband signal to the RF signal and to downconvert the RF signal to the baseband signal, the RF signal being communicated with at least one transmit/receive module.

31. The system of claim 30, wherein the system signal processor is further configured to sum the baseband signals downconverted from the RF signals received from the transmit/receive modules to determine a power level of the received system beam.

32. The system of claim 30, wherein each frequency conversion module includes a conversion signal processor configured to generate the baseband signal that is upconverted to the RF signal and communicated to the transmit/receive module.

33. The system of claim 30, wherein each frequency conversion module includes
   a first local oscillator to upconvert the baseband signal to an intermediate frequency (IF) signal and to downconvert the IF signal to the baseband signal, and
   a second local oscillator to upconvert the IF signal to the RF signal and to downconvert the RF signal to the IF signal.

\* \* \* \* \*